United States Patent
Guo

(10) Patent No.: US 9,548,651 B2
(45) Date of Patent: Jan. 17, 2017

(54) ADVANCED CONTROL CIRCUIT FOR SWITCHED-MODE DC-DC CONVERTER

(71) Applicant: Texas Instruments Incorporated, Dallas, TX (US)

(72) Inventor: Song Guo, Macomb, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 209 days.

(21) Appl. No.: 14/330,102

(22) Filed: Jul. 14, 2014

(65) Prior Publication Data

US 2014/0320104 A1    Oct. 30, 2014

Related U.S. Application Data

(63) Continuation-in-part of application No. 13/774,496, filed on Feb. 22, 2013, now Pat. No. 9,317,049.

(51) Int. Cl.
  *H02M 1/14* (2006.01)
  *H02M 3/158* (2006.01)
  *H02M 1/00* (2006.01)

(52) U.S. Cl.
  CPC ............ *H02M 1/14* (2013.01); *H02M 3/1588* (2013.01); *H02M 2001/0009* (2013.01); *H02M 2001/0025* (2013.01); *H02M 2001/0032* (2013.01); *Y02B 70/1466* (2013.01); *Y02B 70/16* (2013.01)

(58) Field of Classification Search
  CPC .. H02M 2001/0009; H02M 1/14; H02M 1/15; H02M 3/156; H02M 3/158; H02M 3/1588
  See application file for complete search history.

(56) References Cited

U.S. PATENT DOCUMENTS

| | | | |
|---|---|---|---|
| 6,057,675 A | 5/2000 | Tateishi | |
| 6,879,136 B1 * | 4/2005 | Redl | H02M 3/156 323/224 |
| 7,109,692 B1 | 9/2006 | Wu et al. | |
| 7,202,609 B2 | 4/2007 | Langeslag et al. | |
| 7,508,182 B1 * | 3/2009 | Chang | H02M 3/1588 323/282 |
| 7,595,624 B2 | 9/2009 | Tateishi et al. | |
| 7,710,084 B1 * | 5/2010 | Guo | G01R 19/003 323/224 |
| 7,816,896 B2 | 10/2010 | Lipcsei et al. | |
| 8,570,019 B2 | 10/2013 | Nakamura | |

(Continued)

OTHER PUBLICATIONS

Application Report SLVA453 (Feb. 2011), by Texas Instruments Inc.

(Continued)

*Primary Examiner* — Fred E Finch, III
(74) *Attorney, Agent, or Firm* — William B. Kempler; Chares A. Brill; Frank D. Cimino

(57) ABSTRACT

A circuit for controlling a switched-mode DC-DC converter. An inductor is connected between a switching node and an output node, and an output capacitor is connected in series with the inductor. An RC circuit is connected in parallel with the inductor to compensate for ripple voltage. In a discontinuous current mode, a pulse is applied to the switching node and then removed. In this mode, an RC time constant for the RC circuit is increased during the falling edge of a difference signal such that the difference signal does not drop below zero.

16 Claims, 12 Drawing Sheets

(56) References Cited

U.S. PATENT DOCUMENTS

| | | | |
|---|---|---|---|
| 8,766,617 B2 | 7/2014 | Wan et al. | |
| 9,317,049 B2* | 4/2016 | Guo | G05F 1/46 |
| 2005/0052168 A1* | 3/2005 | Tazawa | H02M 3/1584 |
| | | | 323/282 |
| 2009/0146635 A1* | 6/2009 | Qiu | H02M 3/156 |
| | | | 323/290 |
| 2013/0015830 A1* | 1/2013 | Zhang | H02M 1/14 |
| | | | 323/282 |
| 2014/0210443 A1 | 7/2014 | Liu | |
| 2014/0361755 A1* | 12/2014 | Tateishi | H02M 3/158 |
| | | | 323/271 |

OTHER PUBLICATIONS

Zhang et al. "D-CAP(TM) Mode With All-Ceramic Output Capacitor Application," Texas Instruments, Application Report SLVA453, Feb. 2011 (9 pages).

* cited by examiner

ADVANCED CONTROL CIRCUIT FOR SWITCHED-MODE DC-DC CONVERTER

CROSS-REFERENCE

This application is a continuation-in-part of U.S. application Ser. No. 13/774,496 filed Feb. 22, 2013, and entitled Improved Emulated Current Ramp for DC-DC Converter, the entire disclosure of which is incorporated herein by reference.

TECHNICAL FIELD

This disclosure relates in general to electronic circuits, and in particular, to a circuit and method for operating a switched-mode DC-DC converter.

BACKGROUND

A DC-DC converter is an electronic circuit that converts a source of direct current from one voltage level to another. DC-DC converters are widely used in portable electronic devices to provide power from a battery, and are used generally in electronic circuits to regulate an output voltage. For example, a DC-DC converter may be used to compensate for varying load current and/or variations in the input voltage.

A switched-mode DC-DC converter, also called a switching regulator, is a circuit that uses a power switch, an inductor and a capacitor as the primary components to transfer energy from input to output.

FIGS. 1 and 2A, illustrate a DC-DC switching regulator circuit of the prior art as disclosed in U.S. Pat. No. 7,595,624. The switching regulator includes a pulse-width modulation (PWM) controller 52 configured to alternately activate a high-side transistor 54 and a low-side transistor 56 as shown at FIG. 1. The PWM controller 52 controls the duty cycle of pulses provided to both transistors 54 and 56. Transistor 54 has a drain terminal that is connected to a supply voltage source $V_{DD}$. Transistor 56 has a source terminal connected to ground. Transistors 54 and 56 have a common terminal that produces switching voltage $V_{SW}$. An inductor 60 is interconnected between the common terminal and an output terminal producing a voltage $V_{OUT}$. A freewheeling diode 62 is interconnected between one terminal of inductor 60 and ground.

During an on-time, controller 52 activates transistor 54 while transistor 56 remains inactive. When transistor 54 is on, voltage $V_{SW}$ increases to approximately $V_{DD}$. Consequently, current through inductor 60 increases. During an off-time, the controller 52 deactivates transistor 54 and activates transistor 56. Consequently, voltage $V_{SW}$ decreases to approximately ground. Current through inductor 60, however, tends to remain unchanged. Thus, the voltage $V_{SW}$ becomes negative relative to ground so that inductor current is supplied through the freewheeling diode 62. Accordingly, the switching regulator operates to maintain the current flow through inductor 60, thus providing an output voltage $V_{OUT}$ across a load capacitor 64 and a load resistor 66.

The switching regulator also includes a PWM comparison circuit 68 to determine the relative off-time and on-time of transistor 54. The output voltage $V_{OUT}$ is applied to the PWM comparison circuit through a voltage divider 70 that includes resistors $R_1$ and $R_2$. The voltage divider provides a feedback voltage $V_{FB}$ as an output. The PWM comparison circuit includes a ramp signal generator 72 configured to generate a ramp signal, preferably by alternately charging or discharging a capacitor. The feedback voltage $V_{FB}$ and the ramp signal are added together by adder 74. A resultant modified feedback voltage $V_{FB2}$ is provided to a comparator or error amplifier 76, which compares the modified feedback voltage $V_{FB2}$ and the reference voltage $V_{REF}$. The comparator 76 thus provides an output to the PWM controller 52 to switch between the on-time and the off-time. In this manner, on-time ($T_{ON}$) is approximately equal to the switching time ($T_{SW}=T_{ON}+T_{OFF}$) multiplied by $V_{OUT}/V_{DD}$, where the switching regulator frequency is equal to $1/T_{SW}$.

As the operating frequency of the switching regulator circuit of FIG. 2A increases, several problems limit circuit efficiency. Due to noise or other effects, reference voltage $V_{REF}$ can be subject to error such that output voltage $V_{OUT}$ is compared to $V_{REF}$, thereby producing error voltage $V_E$ as shown in FIG. 1. This error voltage produces a next on-time error $T_0$ and a premature output ripple voltage 12.

U.S. Pat. No. 7,595,624 discloses an improvement as shown in FIG. 2B. The maximum feedback voltage $V_{FB}$ is added to reference voltage $V_R$ to produce modified feedback voltage $V_{FB2}$. The relatively steeper slope of $V_{FB2}$ decreases the uncertainty on-time from $T_{UNC1}$ to $T_{UNC2}$.

The circuit of FIG. 2A was subsequently improved with the addition of the current sense circuit 300 of FIG. 3A connected in parallel with inductor 60 as disclosed in Application Report SLVA453 (February 2011), by Texas Instruments Inc. The current sense circuit 300 includes series-connected resistor 301 and capacitor 302 in parallel with inductor 60 and produces positive current sense signal CSP at node 325. Series-connected resistor 304 and capacitor 306 are connected in parallel with capacitor 302 and produce negative current sense signal CSN at node 326.

Referring now to FIG. 3B, a timing diagram shows operation of the current sense circuit 300 of FIG. 3A in continuous current mode (CCM). CCM means that either transistor 54 or 56 is always on. At time t1 transistor 54 is activated and voltage $V_{SW}$ goes high. Responsively, voltage CSP at node 325 emulates the inductor current $I_L$ until transistor 54 is turned off and transistor 56 is turned on. At time t2, voltage CSP at node 325 again emulates inductor current $I_L$ and goes low to a valley at time t3. Voltage CSN at node 326, however, has a constant intermediate value between the peak and valley of CSP.

Referring next to FIG. 3C, a timing diagram shows operation of the current sense circuit 300 of FIG. 3A in discontinuous current mode (DCM). DCM means that either transistor 54 or 56 (FIG. 2A) is on or both are off. At time t1, transistor 54 is activated and voltage $V_{SW}$ goes high. Voltage CSP at node 325 again emulates the inductor current $I_L$ until transistor 54 is turned off and transistor 56 is turned on. At time t2, voltage CSP at node 325 again emulates inductor current $I_L$ and decreases until time t3 when transistor 56 is turned off. Between times t3 and t4, both transistors 54 and 56 are off, inductor current IL is zero, and CSP and CSN vary as capacitors 302 and 306 discharge. However, the offset of CSN in the CCM and DCM operating modes is not constant, and therefore, is difficult to cancel when compared to the signal CSP. Further, there is still a voltage ripple developed around the regulated output voltage in DCM operation, primarily from the inductor, due to the inherent delay in the switching of the power device. Voltage ripple may also be developed from ceramic capacitors that are fabricated on-chip with the DC-DC converter. Compensation can be provided for these ripples by incorporating a ripple injection or emulation circuit that synthesizes an artificial ripple and provides it to a feedback circuit. Such circuits are currently available as integrated circuit DC-DC converter chips, such as TSP53513 and TSP53915 made and sold by Texas Instruments, Inc. These DC-DC converter chips incorporate a control mode architecture that provides ripple control for enhanced system stability.

However, one problem that has been observed in the operation of integrated DC-DC converters that implement a large LC time constant is the presentation of two pulses instead of one at the switching node. This "multi-pulsing" issue can cause improper operation of the converter. Thus, it would be desirable to prevent multi-pulsing at the switching node, as further described herein. Various embodiments described herein are directed to solving these problems and improving operation of the switching regulator.

DETAILED DESCRIPTION

In general, a switched-mode DC-DC converter includes an input stage having a power switching circuit that receives an input voltage, which it modulates as a pulse to a switching node. A switched-mode DC-DC converter also includes an output stage connected to the switching node. The output stage has a series combination of an inductor and a capacitor where current developed across the inductor from an input voltage at the switching node can charge the output capacitor to an output voltage level.

The use of inductance in the output stage leads to some voltage ripple in the output voltage. Further, although external capacitors are normally used, ceramic capacitors could be fabricated on-chip with the converter circuits, and use of on-chip ceramic capacitors would also contributes some ripple. Therefore, a ripple compensation circuit is incorporated to help stabilize the converter.

The ripple compensation circuit includes a combination of resistors, capacitors and switches, and therefore has an RC time constant associated with charging and discharging the LC circuit formed with the inductor and capacitor. By manipulating the RC time constant, improved converter performance can result.

The RC time constant in the ripple compensation circuit is mainly determined by the circuit performance in a continuous conduction mode. A higher RC time constant results in better load transient performance but worse jitter performance. Thus, the RC time constant should be selected to provide acceptable performance for both transient and jitter. A discontinuous conduction mode may result when several zero-crossing events of the inductor current are detected, for example, using a zero-crossing comparator as described below.

Figure 1:
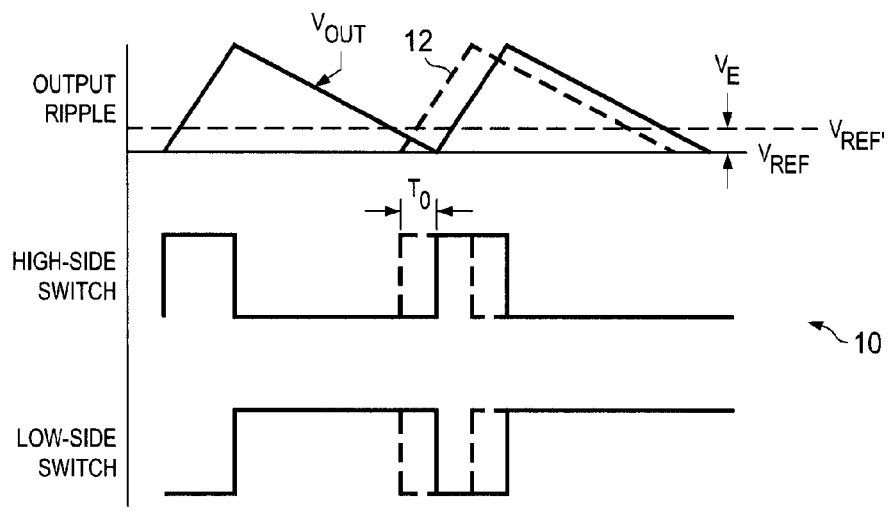
FIG. 1 is a timing diagram showing operation of the DC-DC voltage regulator circuit of FIG. 2A.
Figure 2A:
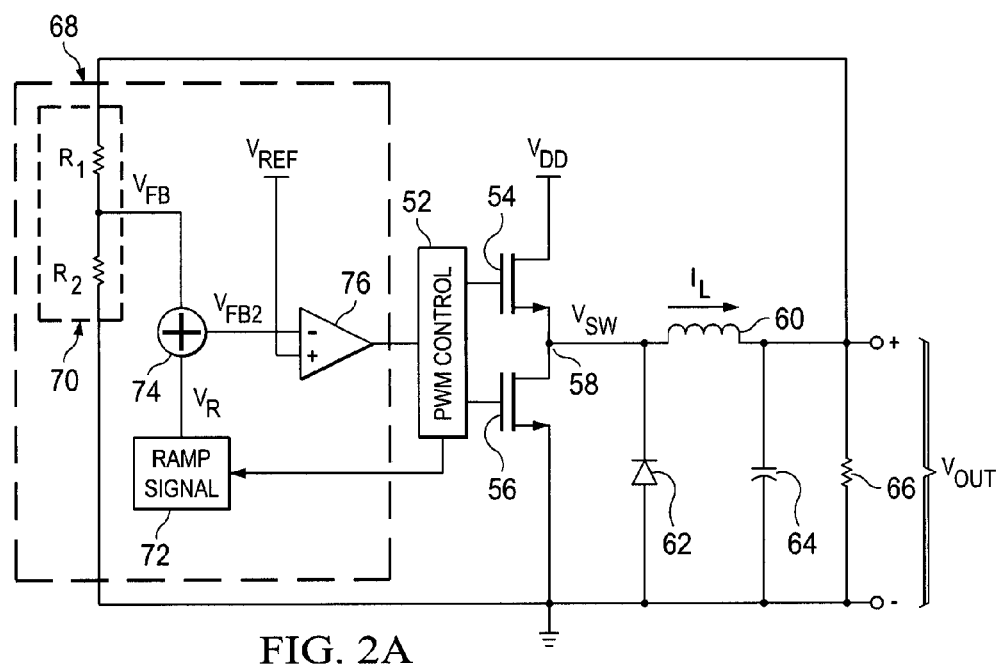
FIG. 2A is a DC-DC voltage regulator circuit of the prior art.
Figure 2B:
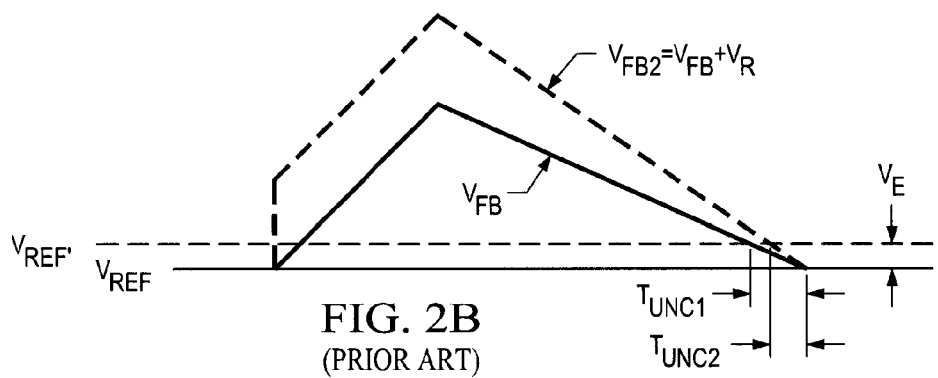
FIG. 2B timing diagram showing an improvement of the circuit of FIG. 2A.
Figure 3A:
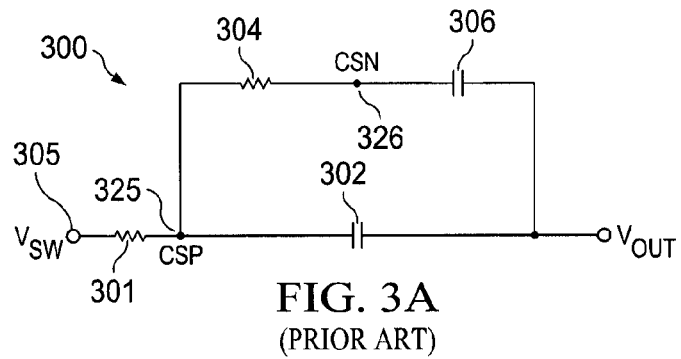
FIG. 3A is a current sense circuit of the prior art added as an improvement to the circuit of FIG. 2A.
Figure 3B:
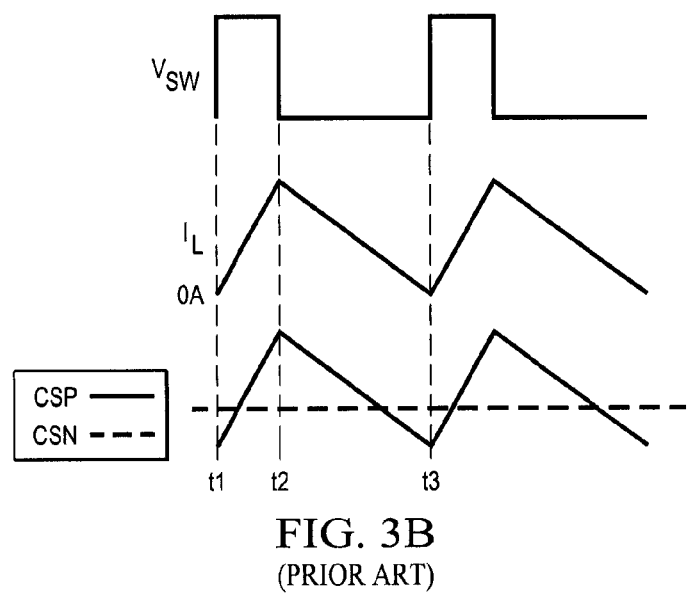
FIGS. 3B and 3C are timing diagrams showing operation of the circuit of FIG. 3A in continuous current mode (CCM) and discontinuous current mode (DCM), respectively.
Figure 3C:
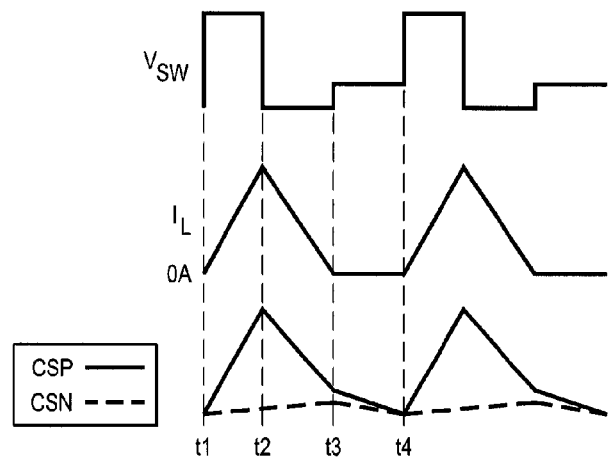
Figure 4:
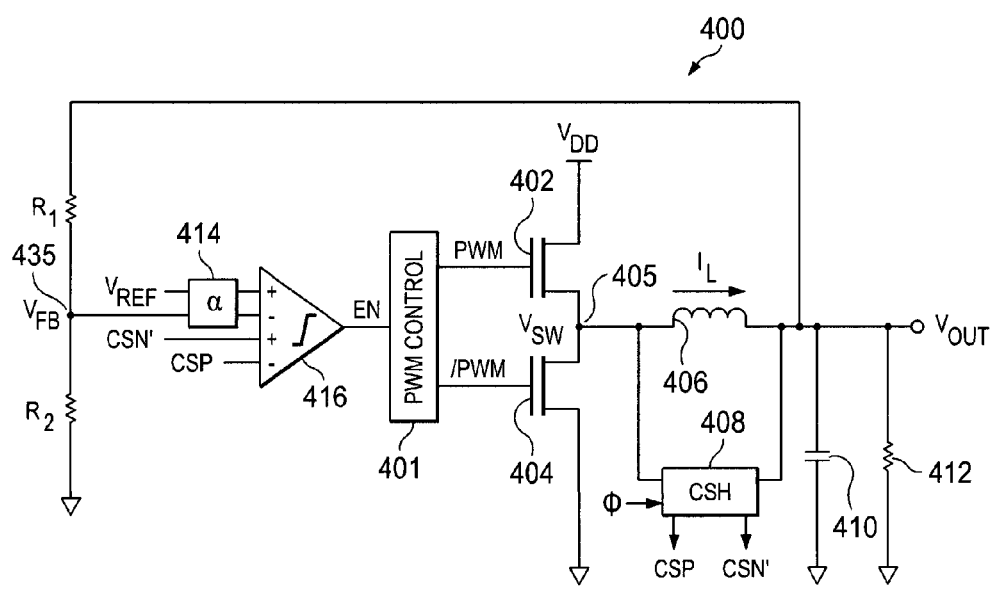
FIG. 4 is an improved DC-DC voltage regulator circuit.

FIG. 4 illustrates a DC-DC voltage regulator circuit 400. The same reference numerals are used in various drawing figures to indicate the same circuit elements. The voltage regulator includes a pulse width modulation (PWM) control circuit 401 that produces control signal PWM and complementary control signal /PWM. In some embodiments, complementary control signal /PWM may be omitted. N-channel transistor 402 has a current path coupled between supply voltage $V_{DD}$ and voltage terminal $V_{SW}$ controlled by PWM. N-channel transistor 404 has a current path coupled between voltage terminal $V_{SW}$ and reference supply voltage terminal $V_{SS}$. The current path of n-channel transistor 404 is controlled by /PWM. Inductor 406 is coupled between voltage terminal $V_{SW}$ and output terminal $V_{OUT}$ to supply load current $I_L$ to load capacitance 410 and load resistance 412. A current sample and hold circuit 408 is coupled in parallel with inductor 406 and produces control signals CSP and CSN' as will be explained in detail.

Output voltage $V_{OUT}$ is fed back to a voltage divider formed by resistors $R_1$ and $R_2$ to produce feedback voltage $V_{FB}$ at node 435 interconnecting resisters $R_1$ and $R_2$. Feedback voltage $V_{FB}$ is compared with reference voltage $V_{REF}$ and signal CSP is compared with signal CSN' by comparator circuit 416 to produce enable signal EN. A multiplier 414 applied to the comparison of $V_{FB}$ with $V_{REF}$ has a gain factor relative to the comparison of CSP and CSN'. In an embodiment, gain factor α has a value of 4 as determined by relative conductivity of comparator transistors.

Figure 5A:
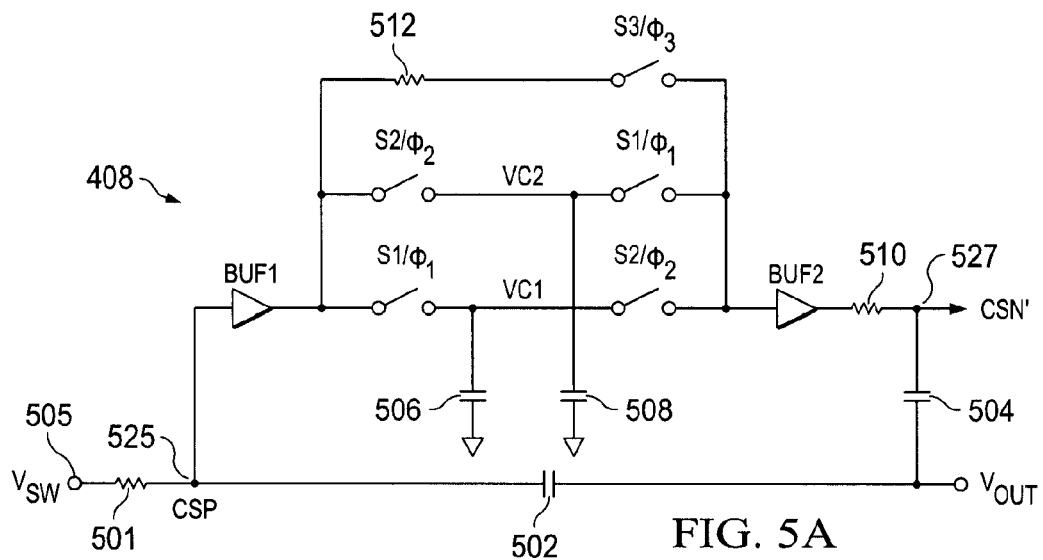
FIG. 5A is a current sample and hold (CSH) circuit.

Turning now to FIG. 5A, one embodiment of current sample and hold circuit 408 will be described in detail. Resistor 501 and capacitor 502 are connected in series between the switching node 505 and the output terminal $V_{OUT}$ to form an RC filter. Control signal CSP at node 525 emulates the current that flows through inductor 406. As used here, emulate means that minimum and maximum values of CSP occur at substantially the same time as the minimum and maximum values of $I_L$, respectively. Moreover, CSP increases as $I_L$ increases. A first buffer BUF1 applies CSP to resistor 512 and to switches $S_1$ and $S_2$, which are controlled by clock signals $\phi_1$ and $\phi_2$, respectively. Here and in the following discussion, switches are used by way of explanation. In some embodiments, these switches may be bipolar transistors, MOS transistors, CMOS transmission gates, or other devices that are well known in the art. A switch $S_3$ controlled by clock signal $\phi_3$ selectively connects resistor 512 to the input terminal of a second buffer BUF2. Capacitor 506 is coupled to receive and store buffered signal CSP (VC1) when switch $S_1$ controlled by clock signal $\phi_1$ is closed. Likewise, capacitor 508 is coupled to receive and store buffered signal CSP (VC2) when switch $S_2$ controlled by clock signal $\phi_2$ is closed. Clock signals $\phi_1$ and $\phi_2$ are alternately activated to apply one of the signals VC1 and VC2 to the input terminal of buffer BUF2 when clock signals $\phi_2$ and $\phi_1$ are activated, respectively. Buffer BUF2 applies the sampled CSP signal, i.e., either VC1 or VC2, to capacitor 504 via resistor 510 where, at node 527, it is stored as signal CSN'.

Figure 5B:
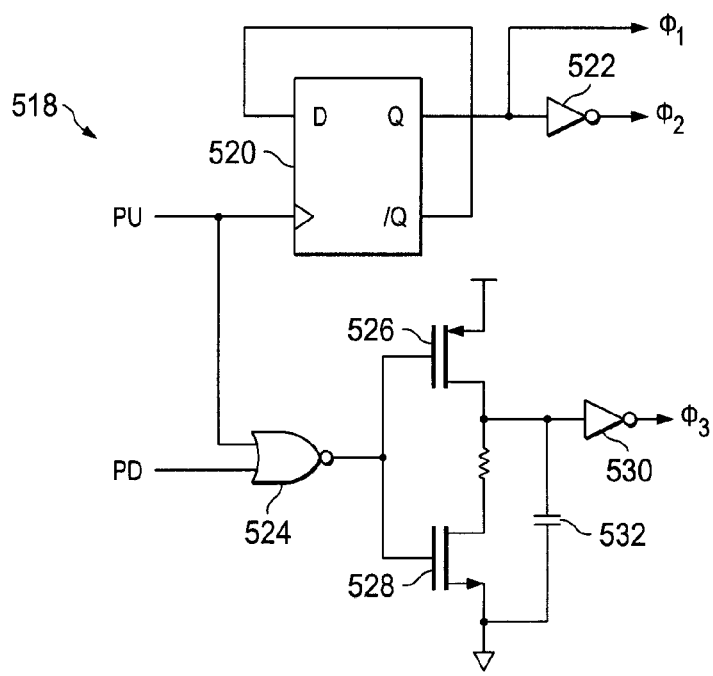
FIG. 5B is a clock generator circuit for the current sample and hold circuit of FIG. 5A.

Referring now to FIG. 5B, operation of the circuit 518 to generate clock signals $\phi_1$, $\phi_2$, and $\phi_3$ for the circuit 408 of FIG. 5A will be described in detail. Pull up control signal PU and pull down control signal PD are generated by the PWM control circuit of FIG. 7 and correspond to control signals PWM and /PWM as will be described in detail. Delay flip flop 520 is coupled to receive control signal PU at a clock terminal and produce a high level of clock signal $\phi_1$ at a first time. Inverter 522 responsively produces a complementary low level of clock signal $\phi_2$ at the first time. The complementary output /Q of delay flip flop 520 is coupled to input terminal D so that a next high level of control signal PU at the clock terminal and produces a low level of clock signal $\phi_1$ at a second time. Inverter 522 responsively produces a complementary high level of clock signal $\phi_2$ at the second time.

In DCM operation, control signals PU and PD are both low at the same time. NOR gate 524 produces a high level signal at the input of a delay inverter formed by p-channel transistor 526, n-channel transistor 528, and an intermediate resistor. The output of the delay inverter is coupled to capacitor 532 to provide an RC output delay. Inverter 530 is coupled to receive the output signal from the delay inverter and produce a high level of clock signal $\phi_3$ while signals PU and PD are both low. The delay inverter and RC elements are preferably designed to provide adequate time for signals PU and PD to settle so that signals CSP and CSN' are approximately equal.

Figure 5D:
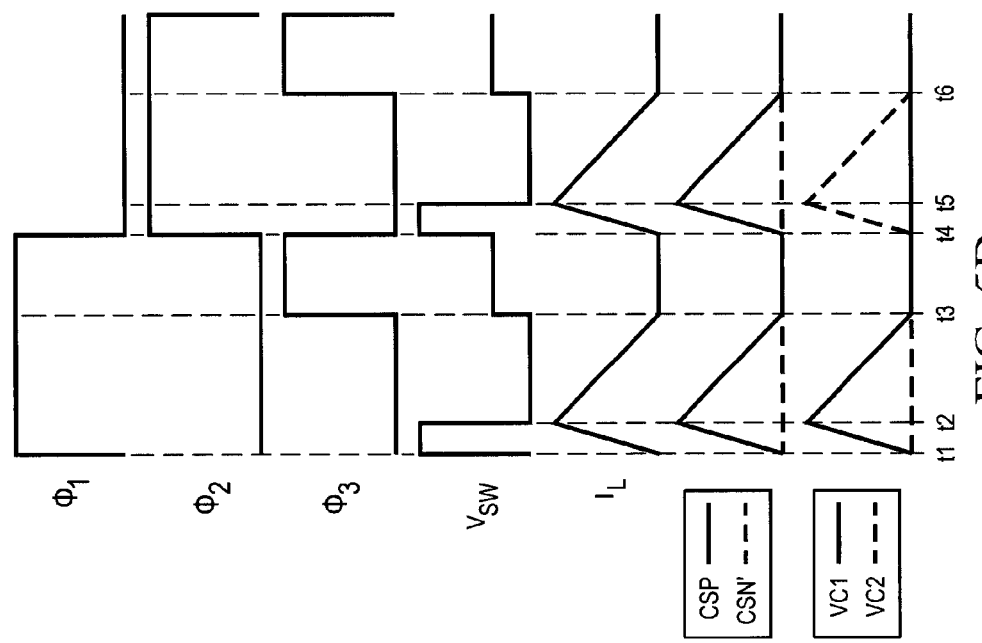
FIGS. 5C and 5D are timing diagrams showing operation of the circuit of FIG. 4 in continuous current mode (CCM) and discontinuous current mode (DCM), respectively.
Figure 5C:
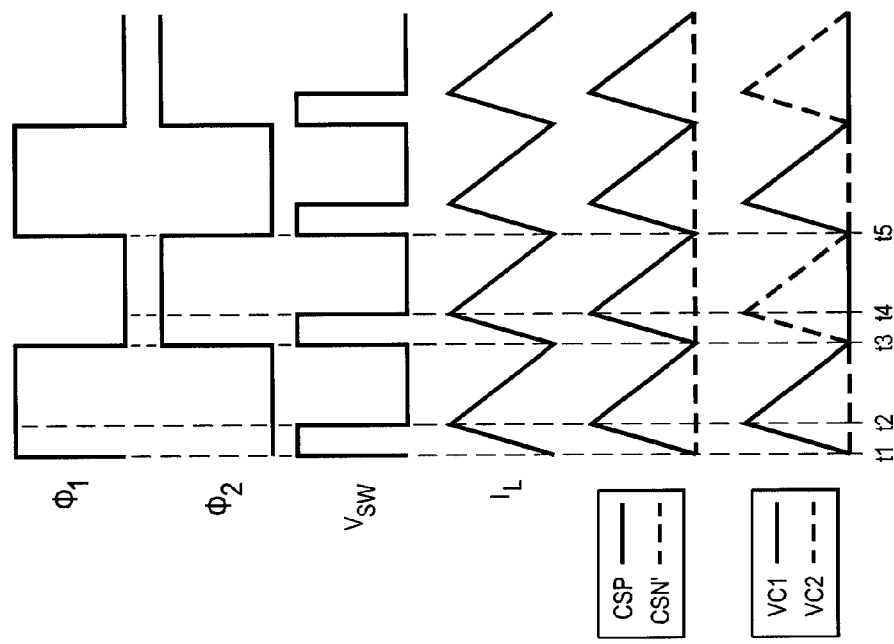

Turning now to FIG. 5C, the CCM operation of the circuits 408, 518 of FIGS. 5A and 5B will be described in detail. At time t1, signal $V_{SW}$ (FIG. 4) goes high in response to control signal PU and corresponding signal PWM. Inductor current $I_L$ increases to a peak value at time t2 while $V_{SW}$ is high. Clock signal $\phi_1$ also goes high at time t1 while clock signal $\phi_2$ remains low. Signal CSP emulates inductor current $I_L$ and attains a peak value at time t2. Since clock signal $\phi_1$ is high, signal VC1 tracks signal CSP. Signals CSN' and VC2 remain low at a previously sampled value of signal CSP stored on capacitor 508. At time t2, signals PU and PWM go low and signals PD and /PWM go high. Responsively, load current $I_L$ decreases to a minimum value at time t3. Signal CSP again emulates inductor current $I_L$ and attains a minimum value at time t3. Since clock signal $\phi_1$ is high until time t3, signal VC1 tracks signal CSP. At time t3, clock signals $\phi_1$ and $\phi_2$ go low and high, respectively. The low level of $\phi_1$ stores a minimum value of signal CSP on capacitor 506 and disconnects capacitor 508 from BUF2. The high level of clock signal $\phi_2$ connects capacitor 506 to BUF2 and stores a new minimum value of signal CSP (VC2) on capacitor 508.

At time t3, signal $V_{SW}$ goes high again in response to control signal PU and corresponding signal PWM. Inductor current $I_L$ increases to a peak value at time t4 while signal $V_{SW}$ is high. Clock signal $\phi_2$ goes high at time t3 while clock signal $\phi_1$ remains low. Signal CSP emulates inductor current $I_L$ and attains a peak value at time t4. Since clock signal $\phi_2$ is high, signal VC2 tracks signal CSP. Signals CSN' and VC1 remain low at a previously sampled value of signal CSP stored on capacitor 506. At time t4, signals PU and PWM go low and signals PD and /PWM go high. Responsively, load current $I_L$ decreases to a minimum value at time t5. Signal CSP again emulates inductor current $I_L$ and attains a minimum value at time t5. Since clock signal $\phi_2$ is high until time t5, signal VC2 tracks signal CSP. At time t5, clock signals $\phi_1$ and $\phi_2$ go high and low, respectively. The low level of $\phi_2$ stores a new minimum value of signal CSP (VC2) on capacitor 508 and disconnects capacitor 506 from BUF2. The high level of $\phi_1$ connects capacitor 508 to BUF2 and stores a new minimum value of signal CSP (VC1) on capacitor 506. The foregoing sequence continues so that one of transistor 402 or 404 is on and the other is off.

Referring next to FIG. 5D, the DCM operation of the circuits 408, 518 of FIGS. 5A and 5B will be described in detail. At time t1, signal $V_{SW}$ (FIG. 4) goes high in response to control signal PU and corresponding signal PWM. Inductor current $I_L$ increases to a peak value at time t2 while $V_{SW}$ is high. Clock signal $\phi_1$ also goes high at time t1 while clock signals $\phi_2$ and $\phi_3$ remain low. Signal CSP emulates inductor current $I_L$ and attains a peak value at time t2. Since clock signal $\phi_1$ is high, signal VC1 tracks signal CSP. Signals CSN' and VC2 remain low at a previously sampled value of signal CSP stored on capacitor 508. At time t2, signals PU and PWM go low and signals PD and /PWM go high. Responsively, load current $I_L$ decreases to a minimum value at time t3. Signal CSP again emulates inductor current $I_L$ and attains a minimum value at time t3. Since clock signal $\phi_1$ is high, signal VC1 tracks signal CSP. At time t3, signals PD and /PWM go low and signals PU and PWM remain low. Clock signals $\phi_1$ and $\phi_2$ remain high and low, respectively. The low level of signals PU and PD at the input terminals of NOR gate 524 produces a high level output signal that is buffered by the delay inverter (transistors 526 and 528) and inverter 530 to produce a high level of clock signal $\phi_3$. From time t3 until time t4, inductor current remains near zero and $V_{SW}$ is approximately equal to $V_{OUT}$. Clock signal $\phi_3$ remains high and connects the output of BUF1 to the input of BUF2 via resistor 512. Between t3 and t4, therefore, the present value of signal CSP replaces the previously sampled value (VC2) on capacitor 508. Responsively, BUF2 produces signal CSN' as the present value of signal CSP. This advantageously avoids leakage of a stored signal CSP sample on capacitor 508 and maintains signal CSN' equal to signal CSP for any time period from t3 to t4.

At time t4, signal $V_{SW}$ goes high again in response to control signal PU and corresponding signal PWM. The high level of PU drives clock signal $\phi_3$ low to disconnect the output of BUF1 from the input of BUF2. Inductor current $I_L$ increases to a peak value at time t5 while $V_{SW}$ is high. Clock signal $\phi_2$ goes high at time t4 and clock signal $\phi_1$ goes low. Signal CSP emulates inductor current $I_L$ and attains a peak value at time t5. Since clock signal $\phi_2$ is high, signal VC2 tracks signal CSP. Signals CSN' and VC1 remain low at a previously sampled value of signal CSP stored on capacitor 506. At time t5, Signals PU and PWM go low and signals PD and /PWM go high. Responsively, load current $I_L$ decreases to a minimum value at time t6. Signal CSP again emulates inductor current $I_L$ and attains a minimum value at time t6. Since clock signal $\phi_2$ is high until time t6, signal VC2 tracks signal CSP. The foregoing sequence may continue in DCM or transition to CCM in response to varying load conditions.

Figure 6:
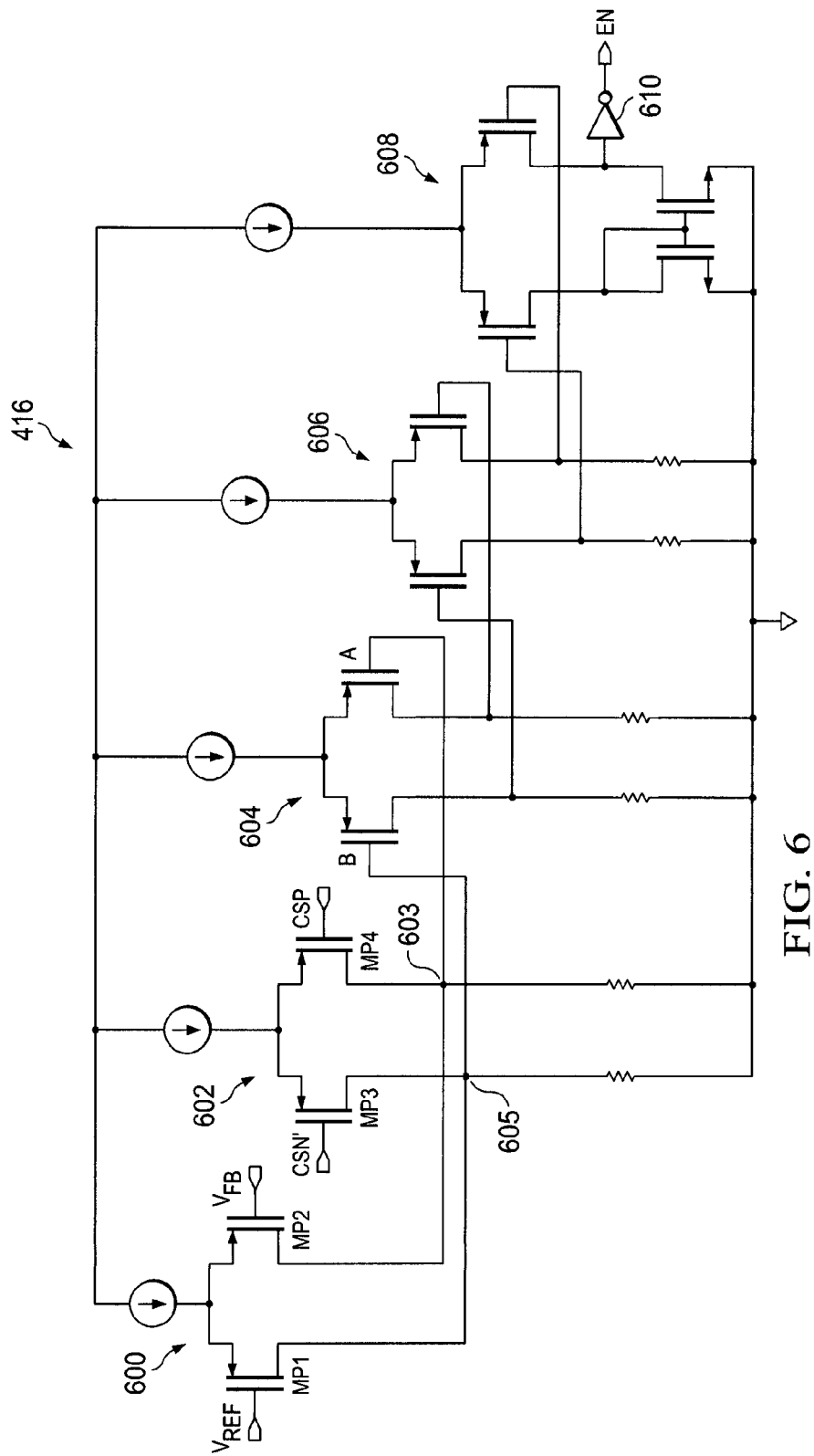
FIG. 6 is a schematic diagram of the 4-input comparator circuit of FIG. 4.

Referring now to FIG. 6, the 4-input comparator circuit 416 of FIG. 4 will be described in detail. In an embodiment, the 4-input comparator circuit includes five comparators 600, 602, 604, 606 and 608. Comparator 600 compares reference voltage $V_{REF}$ to feedback voltage $V_{FB}$. Comparator 602 compares signal CSN' to signal CSP. As previously discussed, comparator 600 has a gain factor α greater than the gain of comparator 602. This gain factor is achieved by increasing the conductivity of transistors MP1 and MP2 with respect to transistors MP3 and MP4. Series connected comparators 604 and 606 amplify the combined difference voltage developed by comparators 600 and 602. Comparator 608 further amplifies the difference voltage from comparator 606 and applies a single output signal to inverter 610. Inverter 610 buffers the single output and produces enable signal EN, which is applied to PWM control circuit 400.

In operation, enable signal EN goes high when the common drain terminal 603 of transistors MP2 and MP4 is positive with respect to the common drain terminal 605 of transistors MP1 and MP3. This condition may occur when feedback voltage $V_{FB}$ is less than reference voltage $V_{REF}$ or when current sense signal CSP is less than current sense signal CSN'. A low-to-high transition of enable signal EN initiates a new on-time pulse in the PWM control circuit of FIG. 7 as will be explained in detail.

Figure 7:
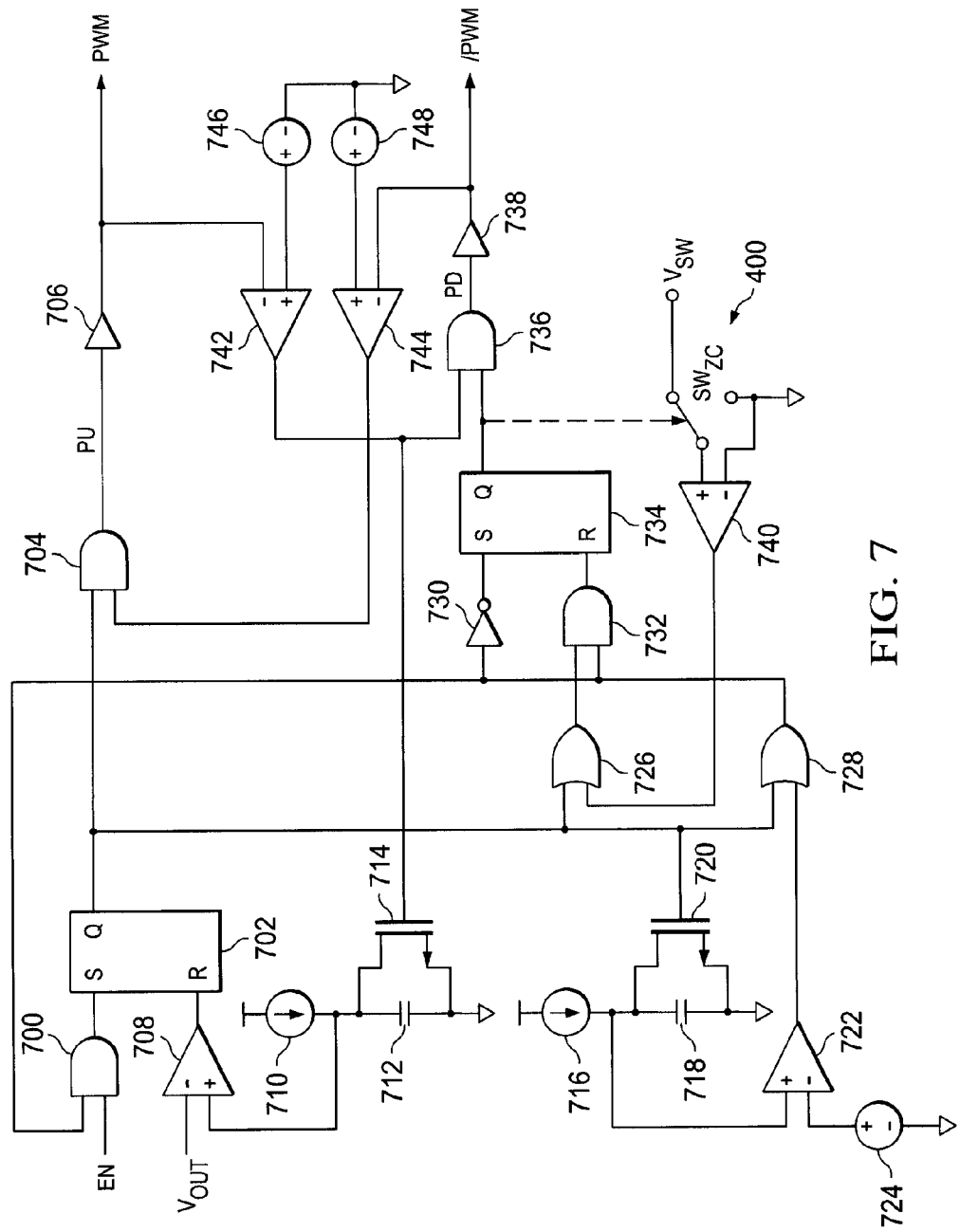
FIG. 7 is a schematic diagram of the PWM control circuit of FIG. 4.

FIG. 7 shows a simplified schematic diagram of the PWM control circuit of FIG. 4. The PWM control circuit includes four major parts that will be discussed separately as well as control logic. First, the on-time timer section includes comparator 708, current source 710, capacitor 712, and n-channel transistor 714. N-channel transistor 714 initially discharges capacitor 712 while current source 710 is off. At the beginning of an on-time pulse, n-channel transistor 714 is turned off and current source 710 is turned on. Duration of the on-time pulse is determined by the time required for current source 710 to charge capacitor 712. Comparator 708 compares the voltage on capacitor 712 with output voltage $V_{OUT}$. When the voltage on capacitor 712 exceeds output voltage $V_{OUT}$, comparator 708 produces a high level output signal at the reset terminal of SR flip flop 702. This resets SR flip flop 702 and produces a low output signal at the Q terminal, thereby terminating the on-time pulse.

Second, the off-time timer section includes comparator 722, reference voltage source 724, current source 716, capacitor 718, and n-channel transistor 720. N-channel transistor 720 initially discharges capacitor 718 while current source 716 is off. At the beginning of an off-time pulse, n-channel transistor 720 is turned off and current source 716 is turned on. Duration of the off-time pulse is determined by the time required for current source 716 to charge capacitor 718. Comparator 722 compares the voltage on capacitor 718 with reference voltage source 724. When the voltage on capacitor 718 exceeds reference voltage source 724, comparator 722 produces a high level output signal at one input terminal of OR gate 728. The other input of OR gate 728 is still low as determined by the Q output of SR flip flop 702 in the previous on-time period. The high level output from OR gate 728 is applied to one input of AND gate 700. However, the next on-time pulse will not begin until enable signal EN goes high. The high level output from OR gate 728 is applied to inverter 730 to drive the S terminal of SR flip flop 734 low. The high level output from OR gate 728 is also applied to AND gate 732 to drive the R terminal of SR flip flop 734 high. The high level of the reset terminal of SR flip flop 734 produces a low output signal at the Q terminal, thereby terminating the off-time pulse.

Third, the zero crossing section includes comparator 740 and switch $SW_{ZC}$. The Q output of SR flip flop 734 is high during an off-time pulse, thereby producing a high level of signals PD and /PWM so that n-channel transistor 404 (FIG. 4) is on. The high level of the Q output of SR flip flop 734 activates switch $SW_{ZC}$ so that comparator 740 compares voltage $V_{SW}$ to reference voltage $V_{SS}$ or ground. If voltage $V_{SW}$ goes negative with respect to ground during the off-time period, comparator 740 produces a low level output at an input of OR gate 726. Together with the low level from the Q terminal of SR flip flop 702, OR gate 726 produces a low level at an input of AND gate 732 to produce a low level at the R input of SR flip flop 734. The low level of the R input of SR flip flop 734 prevents termination of the off-time pulse even if the off-time timer has expired. Thus, n-channel transistor 404 remains on while voltage $V_{SW}$ is negative with respect to ground to prevent any significant undershoot that might induce minority carrier injection.

Fourth, the cross-conduction control section includes AND gates 704 and 736, buffers 706 and 738, comparators 742 and 744, and reference voltage sources 746 and 748. The cross-conduction control section assures that n-channel transistors 402 and 404 are never on at the same time. During an on-time period, for example, AND gate 704 produces a high level signal PU. Buffer 706 buffers this signal to provide a high level of signal PWM at the gate of n-channel transistor 402 as well as at one input of comparator 742. While the level of signal PWM exceeds reference voltage 746, comparator 742 produces a low level output that turns off n-channel transistor 714 and produces a low level signal PD and buffered signal /PWM. Thus, signals PD and /PWM remain low while signal PWM is greater than reference voltage 746. Likewise, during an off-time period AND gate 736 produces a high level signal PD. Buffer 738 buffers this signal to provide a high level of signal /PWM at the gate of n-channel transistor 404 as well as at one input of comparator 744. While the level of signal /PWM exceeds reference voltage 748, comparator 744 produces a low level output which, in turn, produces a low level signal PU and buffered signal PWM. Thus, signals PU and PWM remain low while signal /PWM is greater than reference voltage 748.

Figure 8:
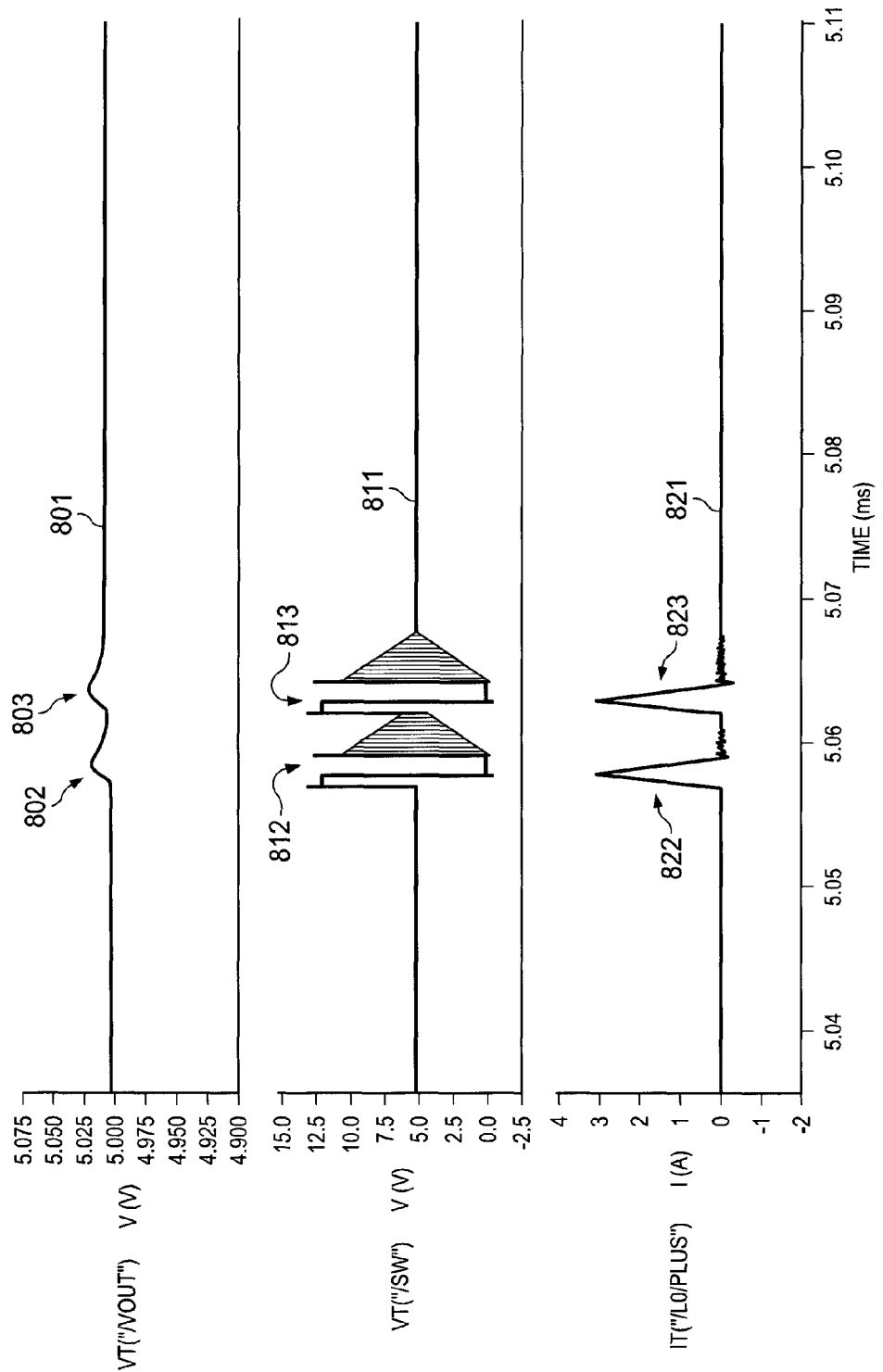
FIG. 8 is a diagram showing voltage at the switching node, voltage at the output node, and current at the inductor in the circuit of FIG. 4.

The DC-DC voltage regulator circuit 400 shown in FIG. 4 can be operated in a "skip mode" wherein cycles are skipped when not needed, thereby improving efficiency at light loads. By not initiating a new cycle, the energy of the inductor 406 discharges to zero and the voltage across the inductor goes to zero. However, multiple pulses may be generated onto switching node 405 if the LC time constant is large. For example, FIG. 8 illustrates three different waveforms resulting from a simulation of the operation of converter circuit 400. In this example, the converter circuit 400 has an inductance value of 2 μH and a capacitance value of 1072 μF, $V_{IN}$=12V, $V_{OUT}$=5V and the switching frequency is 500 KHz. Waveform 801 illustrates the voltage $V_{OUT}$, which is nominally 5V, but a pair of ripples 802, 803 is present in the waveform when a new pulse is presented. Waveform 811 illustrates the applied pulse at the switching node 405, which is a pair of pulses 812, 813 rather than a single pulse, contrary to the design intent. Multiple pulses are not desirable because they can lead to a false trigger of the switching circuit. Waveform 821 illustrates the current sensed at the inductor, which is nominally zero, but spikes 822, 823 occur when the pulses 812, 813, respectively, are applied.

Additional simulations were run to determine the scope of the multi-pulsing problem. For example, at a capacitance of 602 µF and an inductance of 1 µH, multi-pulsing was not observed. Likewise, at a capacitance of 602 µF and an inductance of 2 µH, multi-pulsing was not observed, but at a capacitance of 602 µf and an inductance of 4.7 µH, multi-pulsing was observed. When the capacitance value was changed to 1072 µF multi-pulsing was not observed with an inductance of 1 µH, but it was observed with an inductance of 2 µH. Likewise, at a capacitance of 1072 µF and an inductance of 4.7 µH, multi-pulsing was observed. Thus, the multi-pulsing artifact does not exist when the LC time constant is small or medium in size, but only when the LC time constant is large. When the LC time constant is large, the LC circuit charges and discharges more slowly, and multi-pulsing may appear at the output. The reason that multi-pulsing may appear is that the output voltage $V_{OUT}$ is not adequately charged after one pulse. Although the instantaneous inductor current drops below zero at the end of each pulse, primarily due to switching delays, the average current will remain positive since the load current is always positive. However, if the input to the comparator remains positive at the end of each pulse, then the inductor current can be allowed to drop below zero so long as the current sensing voltage CSP–CSN is prevented from dropping below zero. That is, by manipulating the RC time constant of the ripple generation network, the generation of multiple pulses can be avoided.

Figure 9A:
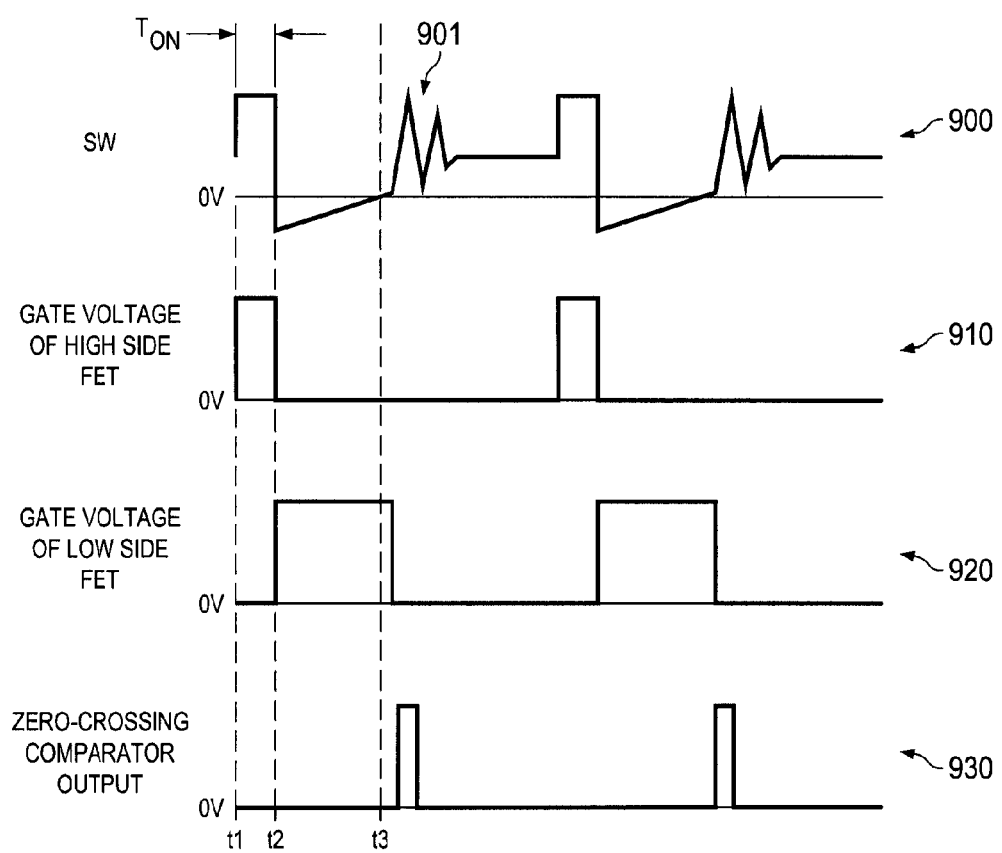
FIG. 9A illustrates voltage waveforms at the switching node, the gate of the high-side switch, and the gate of the low-side switch, and an output waveform of a zero-crossing comparator which detects the zero-crossing point of inductor current, in the circuit of FIG. 4.

Referring now to FIG. 9A, the top graph 900 shows the signal response at switching node 405. When a first pulse is generated at time t1, the switching node 405 initially displays a positive voltage for an on-time $T_{ON}$, and the gate voltage of the high-side switch 402, shown in the second graph 910, steps up to follow the switching node. The gate voltage of the high-side switch 402 is higher that VIN so that the switch will turn on. When the switch 402 is turned on, the voltage at the switching node is almost equal to VIN.

After the first pulse is removed at time t2, the voltage at the switching node 405 decreases to a negative value while the gate voltage of the low-side switch 404, shown in the third graph 920, steps up. The zero crossing comparator 426 compares the switching node 405 with 0V, and the low-side switch 404 is turned off at time t3 by the output of the zero crossing comparator 426 when the switching voltage reaches 0V. However, as described previously, a second pulse 901 could be falsely triggered at end of the first pulse.

Figure 9B:
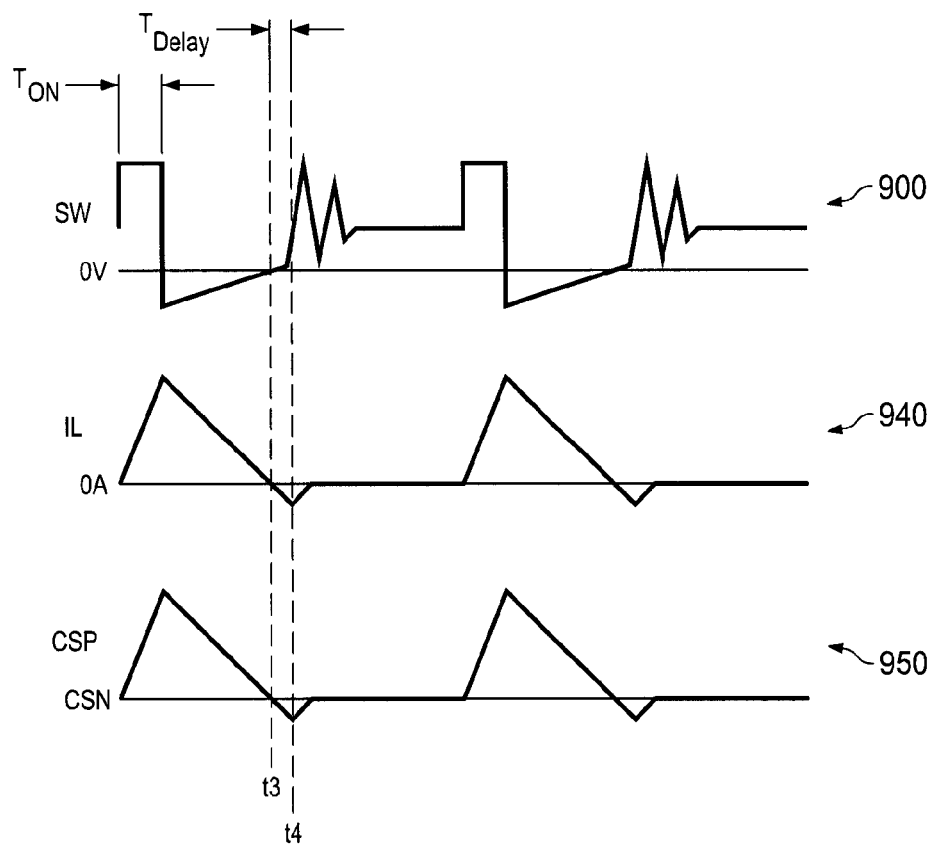
FIG. 9B illustrates a current waveform at the inductor, and a waveform showing the difference between the positive current sense node and the negative current sense node, in the circuit of FIG. 4.

In FIG. 9B, the top graph 900 illustrates a time delay $T_{Delay}$ between the time t3 that the switching voltage equals 0V and the time t4 when the low side switch 404 is turned off. Thus, the middle graph 940 shows the current $I_L$ at the inductor 406 going negative during the time delay, while the bottom graph 950 shows the positive current sense node CSP also going below the negative current sense voltage CSN during the time delay. Therefore, as a result of the time delay, the difference CSP–CSN can also be negative at the end of each pulse due to the time delay.

Figure 9C:
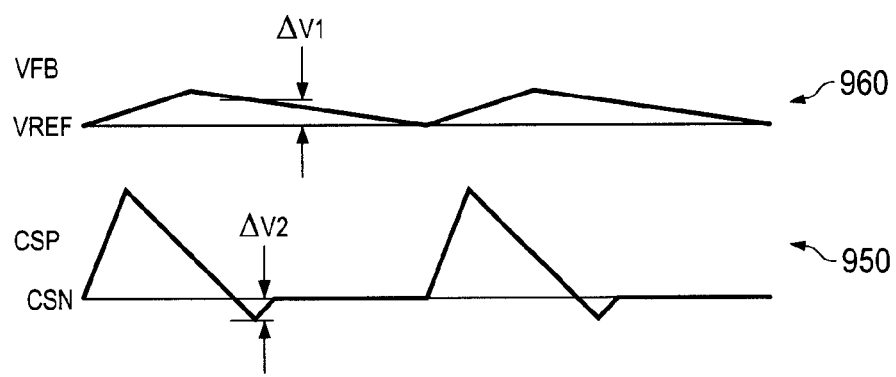
FIG. 9C illustrates a waveform showing the difference between the voltage feedback and the voltage reference, and a waveform showing the difference between the positive current sense node and the negative current sense node, in the circuit of FIG. 4.

In FIG. 9C, the top graph 960 illustrates the difference ΔV1 between the voltage feedback signal $V_{FB}$ and the voltage reference signal $V_{REF}$ at the comparator 416 at the end of the time delay $T_{Delay}$, where:

$$\Delta V1 = \frac{\left(1 - \frac{V_{out}}{V_{in}}\right)V_{out} - 2Lf_{sw}I_{load}}{2LCf_{sw}^2}$$

The bottom graph 950 illustrates the difference ΔV2 between the positive sense current CSP and the negative sense current CSN at the comparator 416 at the end of the time delay $T_{Delay}$, where:

$$\Delta V2 = T_{delay}\frac{V_{out}}{R_{CSP}C_{CSP}}$$

In the equations for ΔV1 and ΔV2 above, $V_{IN}$ is the supply voltage, $V_{OUT}$ is the output voltage, $f_{SW}$ is the switching frequency, L is the inductance, C is the loading capacitance, and $R_{CSP}$ and $C_{CSP}$ are the resistance and capacitance, respectively, in the CSP filter. If α×ΔV1<ΔV2, the loop comparator 416 in FIG. 4 will be triggered and multiple pulses will appear at the switching node in skip mode. By substituting for ΔV1 and ΔV2 in the equations above, multiple pulses will appear when:

$$\alpha\frac{\left(1 - \frac{V_{out}}{V_{in}}\right)V_{out} - 2Lf_{sw}I_{load}}{2LCf_{sw}^2} < \Delta V2 = T_{delay}\frac{V_{out}}{R_{CSP}C_{CSP}}$$

Figure 10:
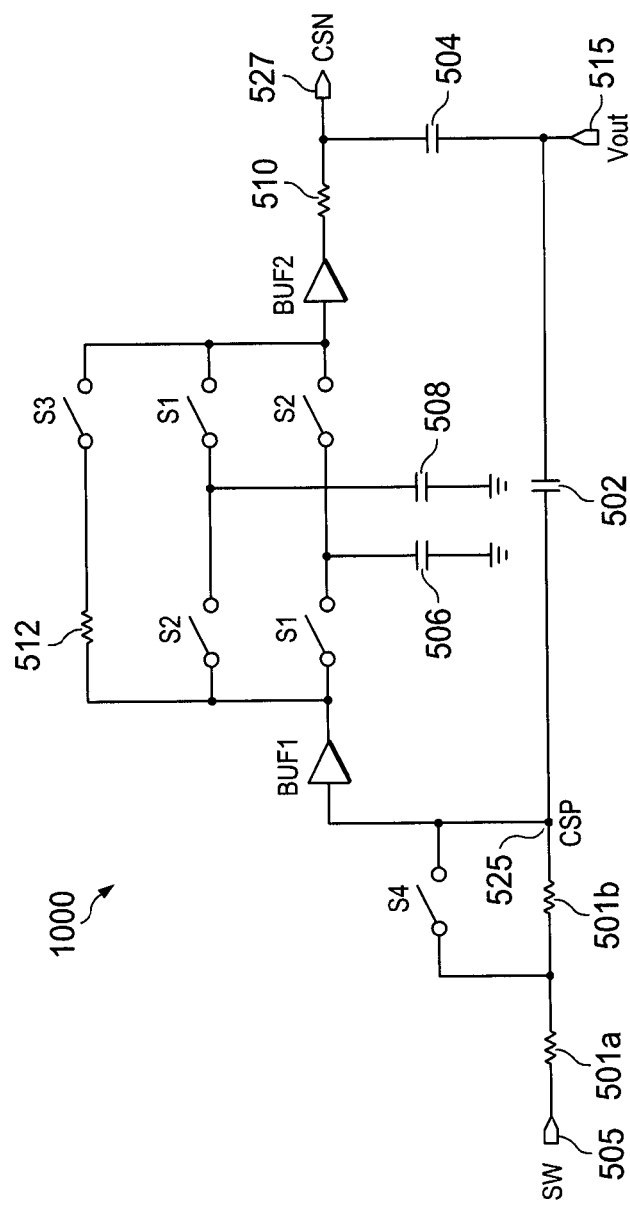
FIG. 10 is a schematic circuit diagram illustrating an improved embodiment of a ripple generation circuit for the switched-mode DC-DC power converter of FIG. 4.

FIG. 10 illustrates a modified circuit 1000 for generating the internal ramp CSP–CSN between the switch node 505 and the output node 515. The circuit 1000 is similar to and replaces circuit 408 shown in FIG. 4. However, since a large LC time constant is problematic, as discussed above, circuit 1000 implements one solution to increase the RC time constant during the falling edge of CSP–CSN. This can be accomplished by splitting resistor 501 from FIG. 5A into two parts in series, namely resistor 501a ($R_{CSP1}$) and resistor 501b ($R_{CSP2}$) as shown in FIG. 10, between nodes 505 and 525. Further, an additional switch S4 is added in parallel to resistor 501b. Switch S4 and resistor 501b are configured to increase the RC time constant during the falling edge of CSP–CSN. Thus, CSP–CSN remains positive at the end of each pulse, and α×(CSP–CSN)+($V_{FB}$–$V_{REF}$)>0, so the next pulse will not be triggered. Therefore, multi-pulsing is eliminated when the following condition is satisfied:

$$\frac{V_{out}}{R_{CSP1}C_{CSP}}T_{off} > \frac{V_{out}}{(R_{CSP1} + R_{CSP2})C_{CSP}}(T_{off} + T_{delay})$$

Rearranging this inequality yields the following:

$$R_{CSP2} > R_{CSP2}\frac{f_{sw}T_{delay}V_{in}}{V_{in} - V_{out}}$$

Figure 11:
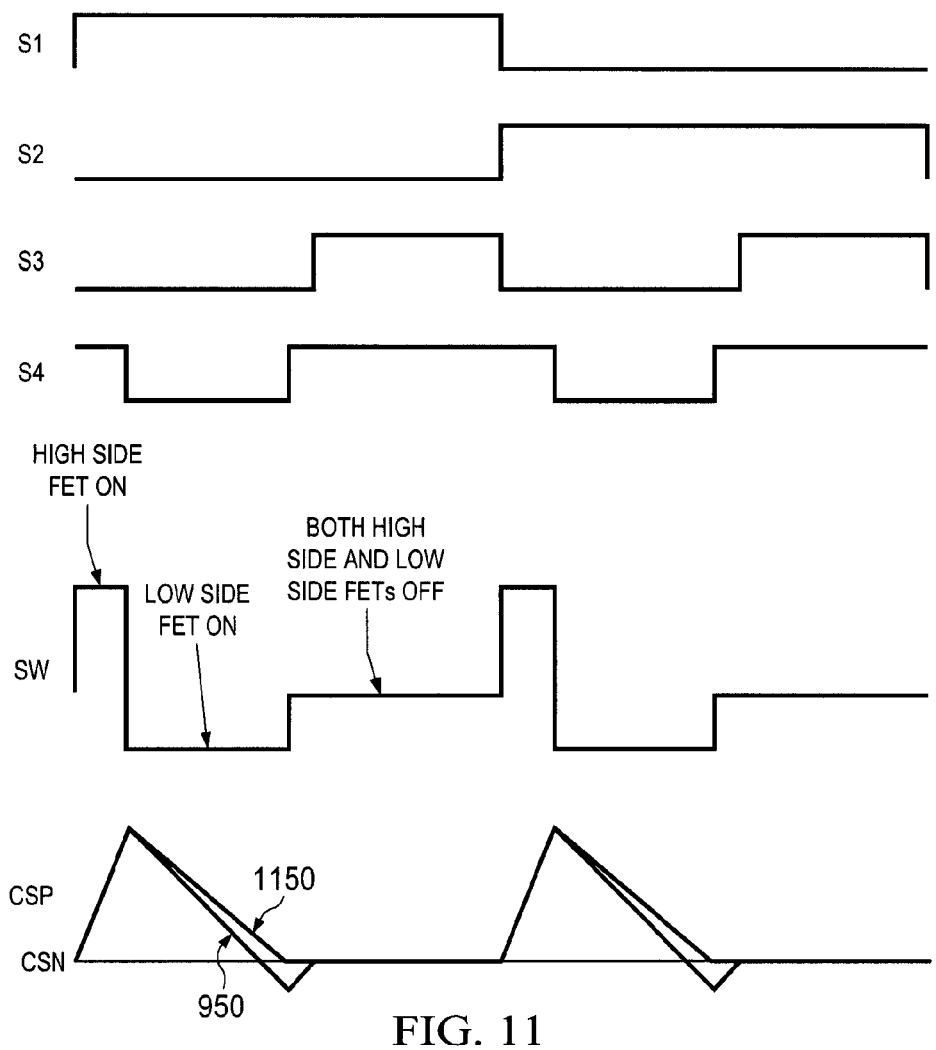
FIG. 11 includes a timing diagram illustrating the operation of the switches in the circuit of FIG. 10, the voltage waveform at the switching node, and a waveform showing the difference between the positive current sense node and the negative current sense node.

FIG. 11 is a timing diagram illustrating the operation of switches S1, S2, S3 and S4, the impact on the voltage at the switching node 505, and the resultant CSP–CSN represented by waveform 1150. It can be seen that by using the modified circuit 1000, the falling edge of CSP–CSN as indicated by waveform 1150 does not go negative, as compared to waveform 950 (see FIG. 9B or 9C) that does go negative, as previously discussed. Thus, the generation of multiple pulses is eliminated by increasing the RC time constant during the falling edge of CSP–CSN.

Although illustrative embodiments have been shown and described by way of example, a wide range of alternative embodiments is possible within the scope of the foregoing disclosure.

The invention claimed is:

1. A circuit for controlling a switched-mode DC-DC converter operating in a discontinuous current mode, comprising:
an LC circuit connected between a switching node and an output node, wherein an input voltage applied as a pulse to the switching node charges the LC circuit and develops an output voltage at the output node, and removing the input voltage from the switching node discharges the LC circuit; and
an RC circuit connected in parallel to the LC circuit between the switching node and the output node to compensate for a ripple voltage, the RC circuit having an RC time constant, a first node proximate to the switching node for detecting a positive current sense signal, and a second node proximate to the output node for detecting a negative current sense signal;
wherein a waveform that measures the positive current sense signal at the first node less the negative current sense signal at the second node has a falling edge after the pulse is removed, the RC time constant is selected such that falling edge of the waveform does not become negative, and wherein the RC time constant is increased during the falling edge of the waveform.

2. The circuit of claim 1, wherein the falling edge of the waveform is controlled to be decreased such that the waveform does not become negative.

3. The circuit of claim 1, wherein the switching node is driven by a control circuit, further comprising:
a feedback circuit having an output connected to the control circuit;
a resistive network connected to the output node and generating a feedback signal connected to a first input of the feedback circuit; and
a voltage reference connected to a second input of the feedback circuit;
wherein the sum of a voltage at the first node less the voltage at the second node, plus the feedback signal less the voltage reference, multiplied by a scaling factor, is greater than zero after the pulse is removed.

4. The circuit of claim 3, wherein:
the LC circuit includes an inductor having a first end connected to the switching node and a second end connected in series with an output resistor and an output capacitor;
the RC circuit includes a first branch having a first resistor and a first capacitor connected in series between the switching node and the output node in parallel with the inductor, and a second branch having a sample and hold circuit, a second resistor and a second capacitor connected in series between the first node and the output node, wherein the first node is located at the interconnection of the first resistor and the first capacitor, and wherein the second node is located at the interconnection of the second resistor and the second capacitor; and
wherein the first node and the second node are connected to respective inputs of the feedback circuit.

5. The circuit of claim 4, further comprising:
a first switch and a third resistor connected in parallel with each other and in series between the first resistor and the sample and hold circuit, wherein the first switch is closed after the pulse is removed to thereby increase the RC time constant of the RC circuit.

6. The circuit of claim 4, further comprising:
a fourth resistor in series with the first resistor, wherein the first resistor is coupled between the switching node and a third node, and
a first switch and the fourth resistor connected in parallel with each other and in series between the third node and the sample and hold circuit, wherein the first switch is closed after the pulse is removed to thereby increase the RC time constant of the RC circuit.

7. A circuit for controlling a switched-mode DC-DC converter, comprising:
a switching node;
a control circuit connected to the switching node and configured to modulate an input voltage as a pulse to the switching node;
an inductor connected between the switching node and an output node;
an output resistor and an output capacitor connected in series to the inductor;
a pair of feedback resistors connected in series between the output node and ground and having a feedback node at an interconnection between the pair of resistors;
a feedback circuit having a plurality of inputs and an output connected to the control circuit;
a ripple compensation circuit connected in parallel with the inductor and having a first node proximate to the switching node for detecting a positive current sense signal and a second node proximate to the output node for sensing a negative current sense signal, the first node and the second node being coupled to respective inputs of the feedback circuit; and
a multiplier having an output connected to the feedback circuit, and the feedback node and a voltage reference connected as inputs and, the multiplier scaling the inputs by a predefined factor;
wherein after the pulse is removed, a difference signal of the first node less the second node is prevented from becoming negative, wherein the ripple compensation circuit is an RC circuit having an RC time constant, and wherein the RC time constant is increased during a falling edge of the difference signal.

8. The circuit of claim 7, wherein the difference signal has a falling edge after the pulse is removed, and the falling edge is decreased such that the difference signal does not become negative.

9. The circuit of claim 7, wherein the RC circuit includes a first branch having a first resistor and a first capacitor connected in series between the switching node and the output node in parallel with the inductor, and a second branch having a sample and hold circuit, a second resistor and a second capacitor connected in series between the first node and the output node, wherein the first node is located at the interconnection of the first resistor and the first capacitor, and wherein the second node is located at the interconnection of the second resistor and the second capacitor.

10. The circuit of claim 9, further comprising:
a first switch and a third resistor connected in parallel with each other and in series between the first resistor and the sample and hold circuit, wherein the first switch is closed after the pulse is removed to thereby increase the RC time constant of the RC circuit.

11. The circuit of claim 9, further comprising:
a fourth resistor in series with the first resistor, wherein the first resistor is coupled between the switching node and a third node, and
a first switch and the fourth resistor connected in parallel with each other and in series between the third node and the sample and hold circuit, wherein the first switch is closed after the pulse is removed to thereby increase the RC time constant of the RC circuit.

12. The circuit of claim 7, wherein the sum of a voltage at the first node less a voltage at the second node, plus the feedback signal less the voltage reference, multiplied by a scaling factor, is greater than zero after the pulse is removed.

13. A method for controlling a switched-mode DC-DC converter operating in a discontinuous current mode, comprising:
   coupling an LC circuit between a switching node and an output node, wherein an input voltage applied as a pulse to the switching node charges the LC circuit and develops an output voltage at the output node, and removing the input voltage from the switching node discharges the LC circuit;
   coupling an RC circuit in parallel to the LC circuit between the switching node and the output node to compensate for a ripple voltage, the RC circuit having an RC time constant, a first node proximate to the switching node for detecting a positive current sense signal, and a second node proximate to the output node for detecting a negative current sense signal;
   detecting a waveform that measures the positive current sense signal at the first node less the negative current sense signal at the second node, wherein the waveform has a falling edge after the pulse is removed, and selecting the RC time constant such that falling edge of the waveform does not become negative;
   further comprising increasing the RC time constant during the falling edge of the waveform.

14. The method of claim 13, further comprising:
   coupling a first branch having a first resistor and a first capacitor in series between the switching node and the output node in parallel with the inductor; and
   coupling a second branch having a sample and hold circuit, a second resistor and a second capacitor in series between the first node and the output node, wherein the first node is located at the interconnection of the first resistor and the first capacitor, and wherein the second node is located at the interconnection of the second resistor and the second capacitor.

15. The method of claim 14, further comprising:
   coupling a first switch and a third resistor in parallel with each other and in series between the first resistor and the sample and hold circuit; and
   closing the first switch after the pulse is removed thereby increasing the RC time constant of the RC circuit.

16. The circuit of claim 14, further comprising:
   placing a fourth resistor in series with the first resistor;
   coupling the first of the pair of resistors between the switching node and a third node;
   coupling a first switch the fourth resistor in parallel with each other and in series between the third node and the sample and hold circuit; and
   closing the first switch after the pulse is removed thereby increasing the RC time constant of the RC circuit.

\* \* \* \* \*